US010945371B2

(12) United States Patent
Lauff et al.

(10) Patent No.: US 10,945,371 B2
(45) Date of Patent: Mar. 16, 2021

(54) ADJUSTABLE STALK STOMPER/CHOPPER CURTAIN ASSEMBLY

(71) Applicant: CNH Industrial America LLC, New Holland, PA (US)

(72) Inventors: Kyle Lauff, Pilesgrove, NJ (US); Eric Lee Walker, Narvon, PA (US); Herb Farley, Elizabethtown, PA (US); Robert D. Crandall, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 193 days.

(21) Appl. No.: 16/000,392

(22) Filed: Jun. 5, 2018

(65) Prior Publication Data
US 2019/0364736 A1 Dec. 5, 2019

(51) Int. Cl.
*A01D 45/02* (2006.01)
*A01D 43/08* (2006.01)
*A01F 12/40* (2006.01)

(52) U.S. Cl.
CPC ......... *A01D 45/021* (2013.01); *A01D 43/082* (2013.01); *A01F 12/40* (2013.01)

(58) Field of Classification Search
CPC .............. A01D 45/021; A01D 43/082; A01D 34/8355; A01D 75/18; A01F 12/40; A01B 31/00; A01B 39/22; A01B 61/046
See application file for complete search history.

(56) References Cited

U.S. PATENT DOCUMENTS

| 3,524,307 | A |   | 8/1970  | Dahl           |            |
|-----------|---|---|---------|----------------|------------|
| 3,611,681 | A | * | 10/1971 | Blanton et al. | A01D 41/14 |
|           |   |   |         |                | 56/10.4    |
| 3,982,384 | A | * | 9/1976  | Rohweder       | A01D 45/021|
|           |   |   |         |                | 56/106     |
| 4,149,361 | A | * | 4/1979  | Pau Letti et al.| A01D 75/18|

(Continued)

FOREIGN PATENT DOCUMENTS

| CA | 987916 A   | 4/1976  |
| DE | 1952250 U  | 12/1966 |

(Continued)

OTHER PUBLICATIONS

May Wess 2015-2016 Catalog Stubble Damage Protection Stalk Stompers for Corn Heads (Year: 2015).*

(Continued)

*Primary Examiner* — Arpad Fabian-Kovacs
(74) *Attorney, Agent, or Firm* — Peter Zacharias; Patrick Sheldrake (57) ABSTRACT

An adjustable stalk stomper and/or chopper curtain assembly for a header of an agricultural harvester. The adjustable assembly comprises a control arm, at least one member connected to the control arm, wherein the at least one member is configured to knock down plant stalks and/or to shield the agricultural harvester from flying debris, and wherein the control arm is configured to provide for adjustment of the orientation of the at least one member relative to the ground and the header. An agricultural harvester header may include the above adjustable assembly and a frame having a toolbar. An agricultural harvester may include such header.

22 Claims, 5 Drawing Sheets

(56) References Cited

U.S. PATENT DOCUMENTS

| | | | | |
|---|---|---|---|---|
| 4,466,492 | A | * | 8/1984 | Steinberg .............. A01B 35/28 172/551 |
| 5,103,624 | A | * | 4/1992 | Marshall .............. A01D 34/435 172/176 |
| 6,539,697 | B2 | | 4/2003 | Burk |
| 7,198,428 | B2 | * | 4/2007 | Pizzuto ................ A01B 31/00 172/180 |
| 7,874,135 | B2 | * | 1/2011 | Nagy ................ A01D 45/021 56/504 |
| 8,171,707 | B2 | * | 5/2012 | Kitchel ................ A01D 45/02 56/504 |
| 8,745,963 | B1 | * | 6/2014 | Shoup .................. A01B 35/20 56/10.2 E |
| 8,979,106 | B2 | | 3/2015 | Benoit et al. |
| 9,095,093 | B2 | | 8/2015 | Hyronimus et al. |
| 9,538,709 | B2 | * | 1/2017 | Bassett et al. ....... A01D 89/004 |
| 9,554,510 | B2 | * | 1/2017 | Nurnberg .......... A01D 34/8355 |
| 9,578,809 | B2 | * | 2/2017 | Reiter .................. A01D 89/002 |
| 9,730,374 | B2 | | 8/2017 | Wick |
| 9,861,036 | B2 | * | 1/2018 | Totten .................. A01D 34/74 |
| 2002/0112461 | A1 | * | 8/2002 | Burk ................ A01D 34/8355 56/504 |
| 2013/0019581 | A1 | * | 1/2013 | Hyronimus ............ A01D 63/00 56/314 |
| 2013/0020100 | A1 | * | 1/2013 | Shoup .................. A01B 61/046 172/762 |
| 2013/0020101 | A1 | * | 1/2013 | Shoup .................. A01B 39/22 172/763 |
| 2013/0061569 | A1 | * | 3/2013 | McClenathen .... A01D 34/8355 56/52 |
| 2013/0174529 | A1 | * | 7/2013 | Hyronimus ............ A01D 75/00 56/314 |
| 2013/0177348 | A1 | * | 7/2013 | Hyronimus ............ A01D 75/00 403/164 |
| 2014/0151073 | A1 | * | 6/2014 | Taylor ................ A01D 34/8355 172/1 |
| 2014/0165527 | A1 | | 6/2014 | Oehler et al. |
| 2015/0201544 | A1 | | 7/2015 | Wick |
| 2015/0250098 | A1 | | 9/2015 | Vandeven et al. |
| 2016/0066504 | A1 | | 3/2016 | Holman |
| 2016/0183468 | A1 | * | 6/2016 | Lohrentz ............. A01D 45/021 56/51 |
| 2018/0020617 | A1 | * | 1/2018 | Weitenberg ............ A01D 34/71 56/503 |
| 2018/0325027 | A1 | * | 11/2018 | Lohrentz et al. .. A01D 34/8355 |

FOREIGN PATENT DOCUMENTS

| | | | | |
|---|---|---|---|---|
| DE | 102013004438 B3 | * | 3/2014 | ........ A01D 34/8355 |
| WO | 2015000768 A1 | | 1/2015 | |
| WO | 2016109714 A1 | | 7/2016 | |
| WO | 2016197231 A1 | | 12/2016 | |

OTHER PUBLICATIONS

May Wess 2011 Catalog Stalk Stompers for Combines & Tractors (Year: 2011).*

Extended European Search Report for EP Application No. 19177828.1 dated Oct. 29, 2019 (six pages).

* cited by examiner

ADJUSTABLE STALK STOMPER/CHOPPER CURTAIN ASSEMBLY

The present disclosure relates generally to an adjustable stalk stomper and/or chopper curtain assembly for use in conjunction with agricultural harvester headers, to headers comprising such adjustable assemblies, to agricultural harvesters comprising such headers, as well as to other machinery comprising such adjustable assemblies.

BACKGROUND OF THE INVENTION

Agricultural harvesters, such as combine harvesters and windrowers, are machines for harvesting agricultural crops. When configured to harvest a crop of corn, for example, a corn header is typically mounted on the combine harvester, which, when in use, severs the crop material (e.g., ears of corn) from the corn stalks. The removed ears of corn are then collected by the combine harvester, while the corn stalks are left standing in a field. The stalks, if not chopped or knocked down, can cause damage to various components of the combine harvester, such as its drive, tires, and/or tracks, thereby negatively impacting both the durability and lifespan of the combine harvester. Furthermore, a tremendous amount of flying debris is generated by conventional corn headers equipped with stalk choppers while chopping corn stalks during a corn harvesting operation. This flying debris can strike and damage components of the combine harvester, including its drive, tires, and/or tracks.

To prevent such damage from standing stalks and flying debris, conventional corn headers are typically equipped with stalk stompers and chopper curtains. Currently, stalk stompers are not integrated into corn headers, but rather are "after-market" add-ons subsequently attached thereto. Given the oftentimes limited available attachment space on corn headers, designing stalk stompers that fit in these tight spaces is a challenge. Furthermore, conventional stalk stompers are attached to corn headers via brackets that are bolted onto the toolbar or the back of the header. As a result, the stalk stompers project out considerably from behind the header, creating a tripping hazard. Additionally, conventional stalk stompers are typically manufactured from heavyweight materials, often weighing up to 100 pounds each. As such, this significant weight makes them difficult to use, reposition, or remove. Also, having a series of heavyweight stalk stompers attached to the header increases the overall weight of the header, which leads to an increased potential for soil compaction during harvesting operations.

Thus, there exists a continuing need for improved headers that can overcome one or more of the disadvantages described above, particularly better protection of agricultural harvesters from damage by standing stalks and/or flying debris generated during harvesting operations. The adjustable assemblies of the present disclosure, when used in combination with conventional headers on agricultural harvesters, overcome one or more of the above disadvantages of conventional stalk stompers.

EMBODIMENTS OF THE INVENTION

One embodiment according to the present disclosure is an adjustable assembly for attachment to a header of an agricultural harvester comprising a control arm and at least one member connected to the control arm, wherein the at least one member is configured to knock down plant stalks and/or to shield the agricultural harvester from flying debris, and wherein the control arm is configured to provide for adjustment of the orientation of the at least one member relative to the ground and the header.

Another embodiment according to the present disclosure is a header for an agricultural harvester comprising a frame having a toolbar and an adjustable assembly that includes a control arm attached to the tool bar, at least one member connected to the control arm, wherein the at least one member is configured to knock down plant stalks and/or to shield the agricultural harvester from flying debris, and wherein the control arm is configured to provide for adjustment of the orientation of the at least one member relative to the ground and the header.

In certain embodiments according to the present disclosure, the at least one member is removably connected to the control arm. In certain embodiments according to the present disclosure, the at least one member is substantially quadrilateral in shape.

In certain embodiments according to the present disclosure, the control arm of the adjustable assembly has a longitudinal axis and adjustment of the orientation of the at least one member relative to the ground and the header is achieved by rotation of the control arm about its longitudinal axis. In certain embodiments according to the present disclosure, the at least one member of the adjustable assembly is movable between a first position and a second position spaced from the first position.

In certain embodiments according to the present disclosure, the adjustable assembly comprises a plurality of members connected to the control arm. In certain embodiments according to the present disclosure, the plurality of members of the adjustable assembly are adjacent to each other. In certain embodiments according to the present disclosure, the plurality of members of the adjustable assembly is aligned in a single plane. In certain embodiments according to the present disclosure, the plurality of members of the adjustable assembly comprises a plurality of members configured to knock down plant stalks and a plurality of members configured to shield the agricultural harvester from flying debris. In certain embodiments according to the present disclosure, each member configured to knock down plant stalks and each member configured to shield the agricultural harvester from flying debris of the adjustable assembly is alternatingly arranged with respect to each other along a length of the control arm. In certain embodiments according to the present disclosure, the orientation of a first sub-plurality of members of the plurality of members connected to the control arm is adjustable independent of the orientation of a second sub-plurality of members of the plurality of members connected to the control arm. In certain embodiments according to the present disclosure, these first and second sub-pluralities of members are removably connectable to the control arm independent of each other.

In certain embodiments according to the present disclosure, a longitudinal extent of a lateral edge of the at least one member of the adjustable assembly extends substantially the length of an entire longitudinal extent of a lateral edge of at least one other member of the adjustable assembly. In certain embodiments according to the present disclosure, the at least one member of the adjustable assembly has a longitudinal length greater than a longitudinal length of at least one other member of the adjustable assembly. In certain embodiments according to the present disclosure, the at least one member of the adjustable assembly comprises steel, a high density polymer, an elastomer, a composite, a glass-filled nylon, an ultra-high molecular weight polyethylene, and/or fiberglass-reinforced plastic. In certain embodiments according to the present disclosure one of the plurality of members comprises a metal, a high density polymer, an elastomer, or a composite, and another of the plurality of members comprises another of a metal, a high density polymer, an elastomer, or a composite. In certain embodiments according to the present disclosure, the at least one member of the adjustable assembly includes a planar upper portion and a curved lower portion extending from the planar upper portion.

In certain embodiments according to the present disclosure, the at least one member of the adjustable assembly includes a biasing member for biasing the at least one member toward the ground. In certain embodiments according to the present disclosure, the biasing member for biasing the at least one member of the adjustable assembly is selected from the group consisting of torsion springs, polymer torsion blocks, gas shocks, and leaf springs. In certain embodiments according to the present disclosure, the biasing member for biasing the at least one member of the adjustable assembly is directly connected to the control arm and the at least one member is directly connected to the biasing member.

In certain embodiments according to the present disclosure, the above-described header further includes an actuator operatively engaged with the control arm for adjusting the orientation of the at least one member relative to the ground, a frame of the header and/or the header. In certain embodiments according to the present disclosure, the at least one member is positioned about the lower rear end of a row unit of the above-described header.

Another embodiment according to the present disclosure is an agricultural harvester comprising the above-described header.

Another embodiment according to the present disclosure is a machine comprising the above-described adjustable assembly, wherein the machine is selected from the group consisting of combine harvesters, forage harvesters, flail mowers, and rotary mowers.

Other features and advantages of the present disclosure will be apparent from the following more detail description of the exemplary embodiments.

BRIEF DESCRIPTION OF THE SEVERAL VIEWS OF THE DRAWINGS

The foregoing, as well as the following detailed description of exemplary embodiments of the present disclosure, will be better understood when read in conjunction with the appended drawings. For the purpose of illustrating the present disclosure, there are shown in the drawings exemplary embodiments. It should be understood, however, that the present disclosure is not limited to the precise arrangements and instrumentalities shown.

In the drawings.

DETAILED DESCRIPTION OF THE DISCLOSURE

Reference will now be made in detail to the various exemplary embodiments illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms, such as top, bottom, left, right, above, below, and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the present disclosure in any manner not explicitly set forth. Additionally, the term "a," as used in the present disclosure, means "at least one." The terminology includes the words specifically mentioned above, derivatives thereof, and words of similar import.

The terms "plant," "agricultural crop," "stalk," "debris," and "crop material" are used throughout the specification for convenience and it should be understood that these terms are not intended to be limiting. Thus, "stalk" refers to the lower part of a crop which is the discardable portion of the crop material. The adjustable assembly according to the present disclosure can be employed in the harvest of a variety of crops, including but not limited to, corn and other grains. The terms "debris," "material other than grain," and the like are used interchangeably.

The term "about," as used herein when referring to a measurable value such as an amount, a temporal duration, and the like, is intended to encompass variations of ±20%, ±10%, ±5%, ±1%, or ±0.1% from the specified value, as such variations are appropriate.

Throughout the present disclosure, various aspects thereof can be presented in a range format. It should be understood that the description in range format is merely for convenience and brevity and should not be construed as an inflexible limitation on the scope of the present disclosure. Accordingly, the description of a range should be considered to have specifically disclosed all the possible subranges, as well as individual numerical values within that range. For example, description of a range, such as from 1 to 6, should be considered to have specifically disclosed subranges, such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, and 6. This applies regardless of the breadth of the range.

The term "substantially," as used herein, shall mean considerable in extent, largely, but not wholly, that which is specified, or an appropriate variation therefrom as is acceptable within the field of art.

Furthermore, the described features, advantages, and characteristics of the exemplary embodiments of the present disclosure may be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages may be recognized in certain embodiments that may not be present in all exemplary embodiments of the present disclosure.

Figure 1:
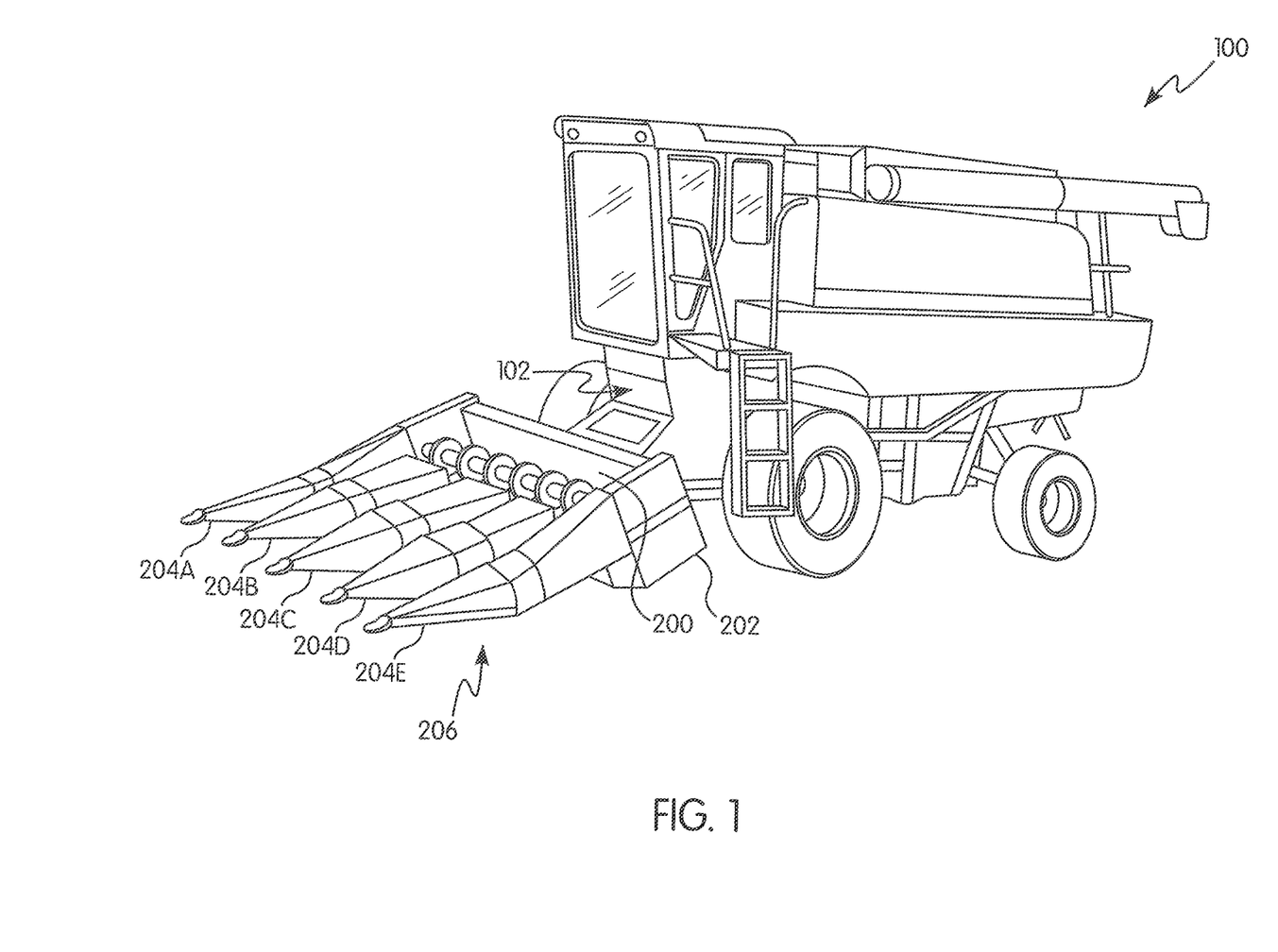
FIG. 1 is a perspective view of a combine harvester in accordance with exemplary embodiments of the present disclosure.

Referring now to the drawings, FIG. 1 illustrates a combine harvester 100. Combine harvester 100 includes a combine 102 and a header 200. The header 200 includes a frame 202 and several row units 204A, 204B, 204C, 204D, and 204E about the front end 206 of header 200. Such row units 204A, 204B, 204C, 204D, and 204E are known in the art and a further detailed description of their structure, function, and operation is not necessary for a complete understanding of the present disclosure. However, exemplary row units applicable to the present disclosure are disclosed in U.S. Pat. Nos. 5,960,618; 7,073,316; 7,913,480; 7,874,134; and 7,373,767, the entire disclosures of which are hereby incorporated by reference for all purposes.

Figure 2:
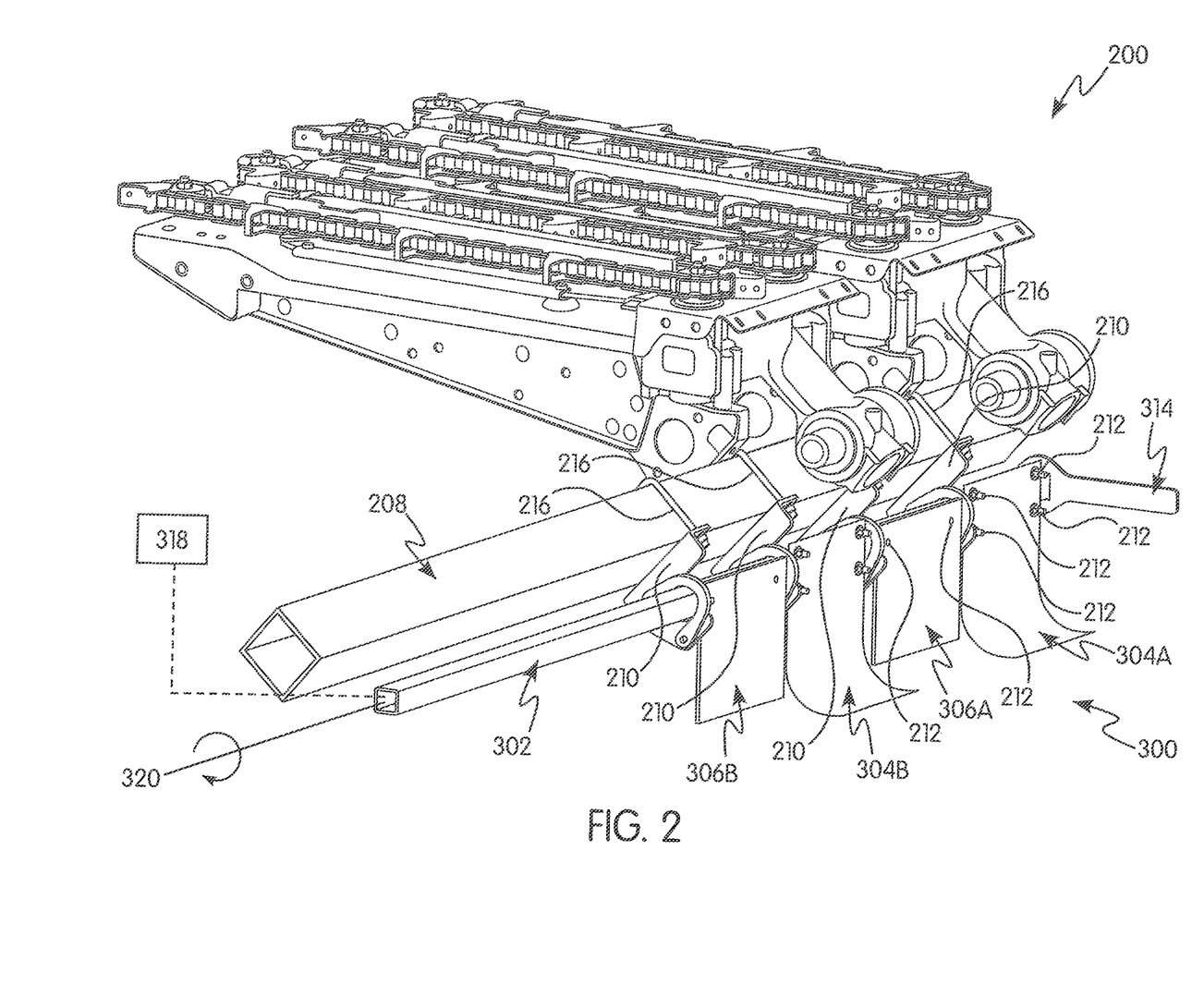
FIG. 2 is a partial rear perspective view of a header in accordance with exemplary embodiments of the present disclosure.

Referring now to FIG. 2, header 200 includes an elongated bar 208, commonly known in the art as a tool bar, which extends from one lateral side to another lateral side of the header 200. Tool bar 208 can be used to removably mount row units 204A, 204B, etc., and an adjustable assembly 300 comprising a control arm 302 and a plurality of members or tools connected to the control arm, wherein certain of the members or tools are configured to knock down/flatten plant/crop stalks, e.g., stalk stompers 304A, 304B, and 304C, and certain others of the members or tools are configured to shield the agricultural harvester from flying debris, e.g., chopper curtains 306A, 306B, 306C, and 306D. In certain embodiments of the present disclosure, the members are configured to both knock down/flatten plant/crop stalks and shield the agricultural harvester from flying debris, i.e., the members function simultaneously as both stalk stompers and chopper curtains. Tool bar 208 can include mounting members 210 upon which control arm 302 is mounted. In an exemplary aspect, control arm 302 is a hollow elongated bar that extends from one lateral side to another lateral side of header 200 and is parallel or substantially parallel to tool bar 208. Control arm 302 is configured to receive the plurality of members configured to knock down/flatten plant/crop stalks and/or shield the agricultural harvester from flying debris, e.g., stalk stompers 304A, 304B, and 304C and chopper curtains 306A, 306B, 306C, and 306D.

The at least one member connected to control arm 302, whether stalk stompers 304A, 304B, and 304C and/or chopper curtains 306A, 306B, 306C, and 306D, of the adjustable assemblies according to the present disclosure can be permanently or removably connected to the control arm. In an exemplary aspect, and as best shown in FIG. 2, the plurality of stalk stompers 304A, 304B, and 304C and the plurality of chopper curtains 306A, 306B, 306C, and 306D are configured to receive fasteners 212, which connect the plurality of stalk stompers 304A, 304B, and 304C and the plurality of chopper curtains 306A, 306B, 306C, and 306D to control arm 302 via mounting members 210.

As shown in FIG. 2, control arm 302 is configured to receive a handle 314. The handle is positioned adjacent one of the lateral ends of control arm 302. In this exemplary embodiment, handle 314 is an elongated lever used to manually facilitate the rotation of control arm 302 about its longitudinal axis 320. Alternatively, an actuator 318 can be installed on control arm 302 to facilitate rotation of control arm 302 about its longitudinal axis 320.

The header 200 includes fasteners 216 to facilitate connections between tool bar 208 and mounting members 210. Any suitable fasteners may be used. An example of such fasteners includes, but is not limited to, u-bolts.

Figure 3A:
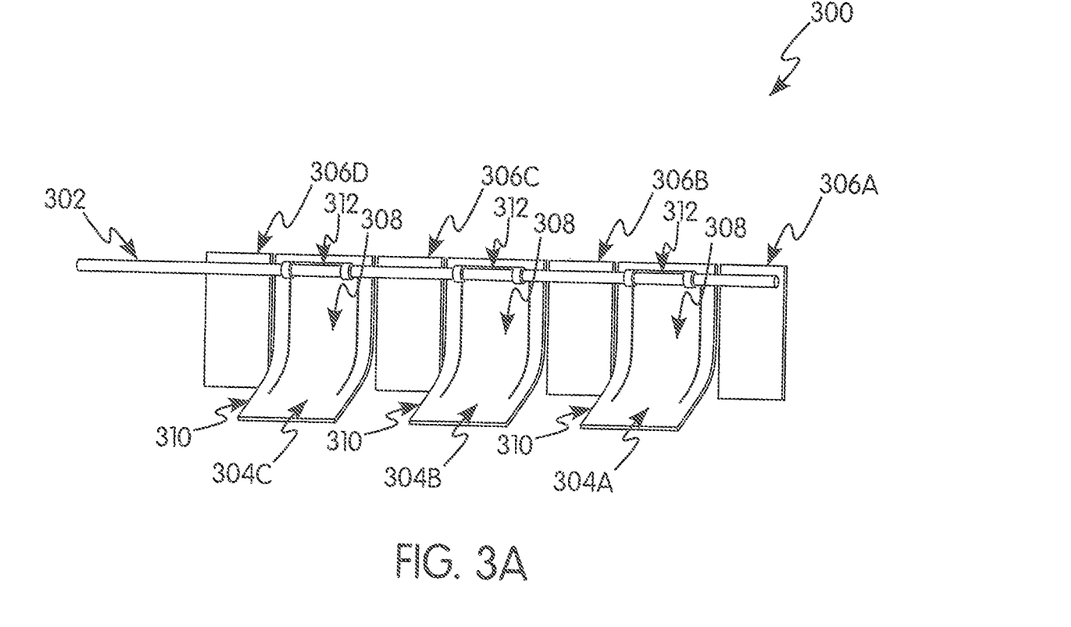
FIG. 3A is a perspective view of adjustable assembly in accordance with exemplary embodiments of the present disclosure.
Figure 3B:
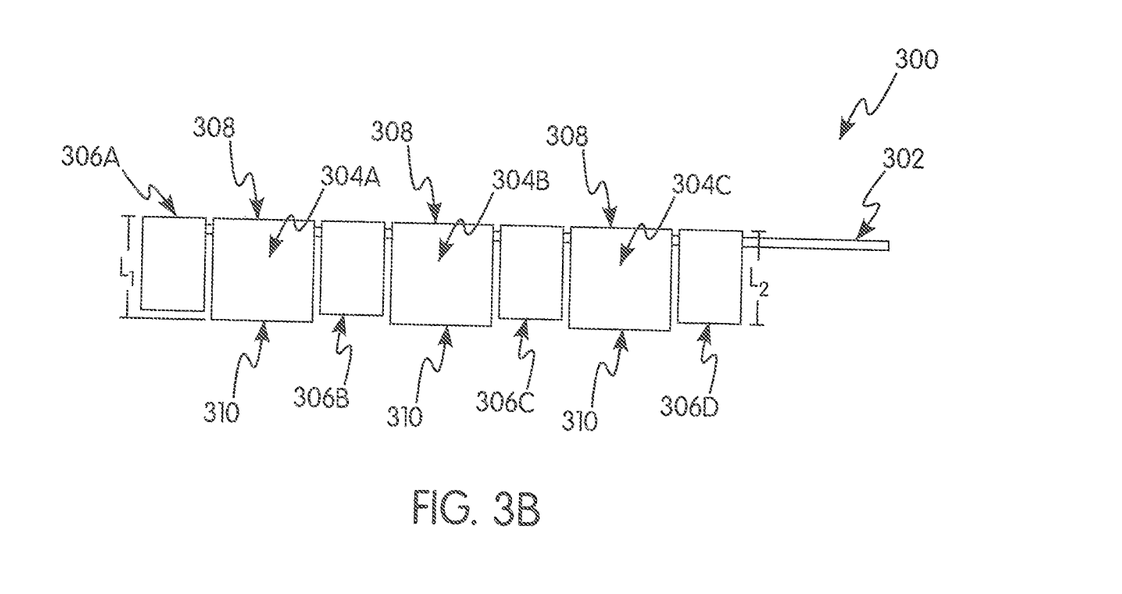
FIG. 3B is front view of the adjustable assembly of FIG. 3A.

The at least one member connected to control arm 302, whether functional as stalk stompers 304A, 304B, and 304C and/or chopper curtains 306A, 306B, 306C, and 306D, of the adjustable assembly according to the present disclosure can take any suitable shape. Examples of such shapes include, but are not limited to, quadrilateral shapes, such as squares, rectangles, trapezoids, rhomboids, and the like. In an exemplary aspect, and as best shown in FIGS. 3A and 3B, each of the plurality of stalk stompers 304A, 304B, and 304C and each of the plurality of chopper curtains 306A, 306B, 306C, and 306D are substantially rectangular in shape. In certain embodiments according to the present disclosure, each of the plurality of stalk stompers 304A, 304B, and 304C can include a planar upper portion 308 and a curved lower portion 310.

The at least one member connected to control arm 302, whether functional as stalk stompers 304A, 304B, and 304C and/or chopper curtains 306A, 306B, 306C, and 306D, of the adjustable assemblies according to the present disclosure can be of any suitable dimension. For example, when the at least one member connected to control arm 302 are quadrilateral in shape, each member can be of any suitable length and width. Examples of suitable widths, include, but are not limited to, any width from about 5 inches to 30 inches or from about 10 inches to 20 inches. In certain embodiments according to the present disclosure, a suitable width of a member that is quadrilateral in shape is from about 12 inches to 14 inches. In an exemplary aspect, and as best shown in FIG. 3B, a longitudinal length (L1) of each of the plurality of stalk stompers 304A, 304B, and 304C is greater than a longitudinal length (L2) of each of the plurality of chopper curtains 306A, 306B, 306C, and 306D.

Furthermore, the at least one member connected to control arm 302, whether functional as stalk stompers 304A, 304B, and 304C and/or chopper curtains 306A, 306B, 306C, and 306D, of the adjustable assemblies according to the present disclosure can be formed from any suitable material. Examples of such materials include, but are not limited to, steel and lightweight materials, such as a high density polymers, fiberglass reinforced plastics (e.g., glass-filled nylon), elastomers, composites, ultra-high molecular weight polyethylene, and the like, or any combination thereof.

As shown in FIG. 3A, the at least one member connected to control arm 302, whether functional as stalk stompers 304A, 304B, and 304C and/or chopper curtains 306A, 306B, 306C, and 306D, of the adjustable assembly according to the present disclosure can include a biasing member 312, which biases the at least one member connected to control arm 302 toward the ground. Examples of such biasing members include, but are not limited to, torsion springs, polymer torsion blocks, gas shocks, and leaf springs. In an exemplary aspect, and as best shown in FIG. 3A, the control arm 302 is configured to receive a plurality of torsion springs as the biasing members. As depicted therein, each of the plurality of biasing members 312 biases each of the plurality of stalk stompers 304A, 304B, and 304C, respectively, toward the ground.

In accordance with the exemplary embodiments of the present disclosure, and as depicted in FIGS. 1 through 5, header 200 is operatively connected to combine 102. Tool bar 208 is operatively connected to header 200. Mounting members 210 are fastened onto tool bar 208, e.g., with the aid of fasteners 216. Control arm 302 is operatively connected to tool bar 208 via mounting members 210. Control arm 302 is secured onto mounting members 210 and the plurality of members configured to knock down/flatten plant/crop stalks and/or shield the agricultural harvester from flying debris, e.g., stalk stompers 304A, 304B, and 304C and chopper curtains 306A, 306B, 306C, and 306D are operatively connected to control arm 302 via fasteners 212 such that the plurality of stalk stompers 304A, 304B, and 304C and chopper curtains 306A, 306B, 306C, and 306D are aligned linearly adjacent to one another in a single plane or substantially in a single plane in an alternating fashion on control arm 302. In accordance with alternative exemplary embodiments of the present disclosure, the at least one members connected to control arm 302, whether functional as stalk stompers 304A, 304B, and 304C and/or chopper curtains 306A, 306B, 306C, and 306D, can also be arranged randomly, or in any suitable pattern or group, and in any plane or orientation relative to each other, on control arm 302. Biasing members 312 are mounted on control arm 302 and operatively connected to each of the plurality of stalk stompers 304A, 304B, and 304C for biasing the stalk stompers toward the ground.

Figure 4:
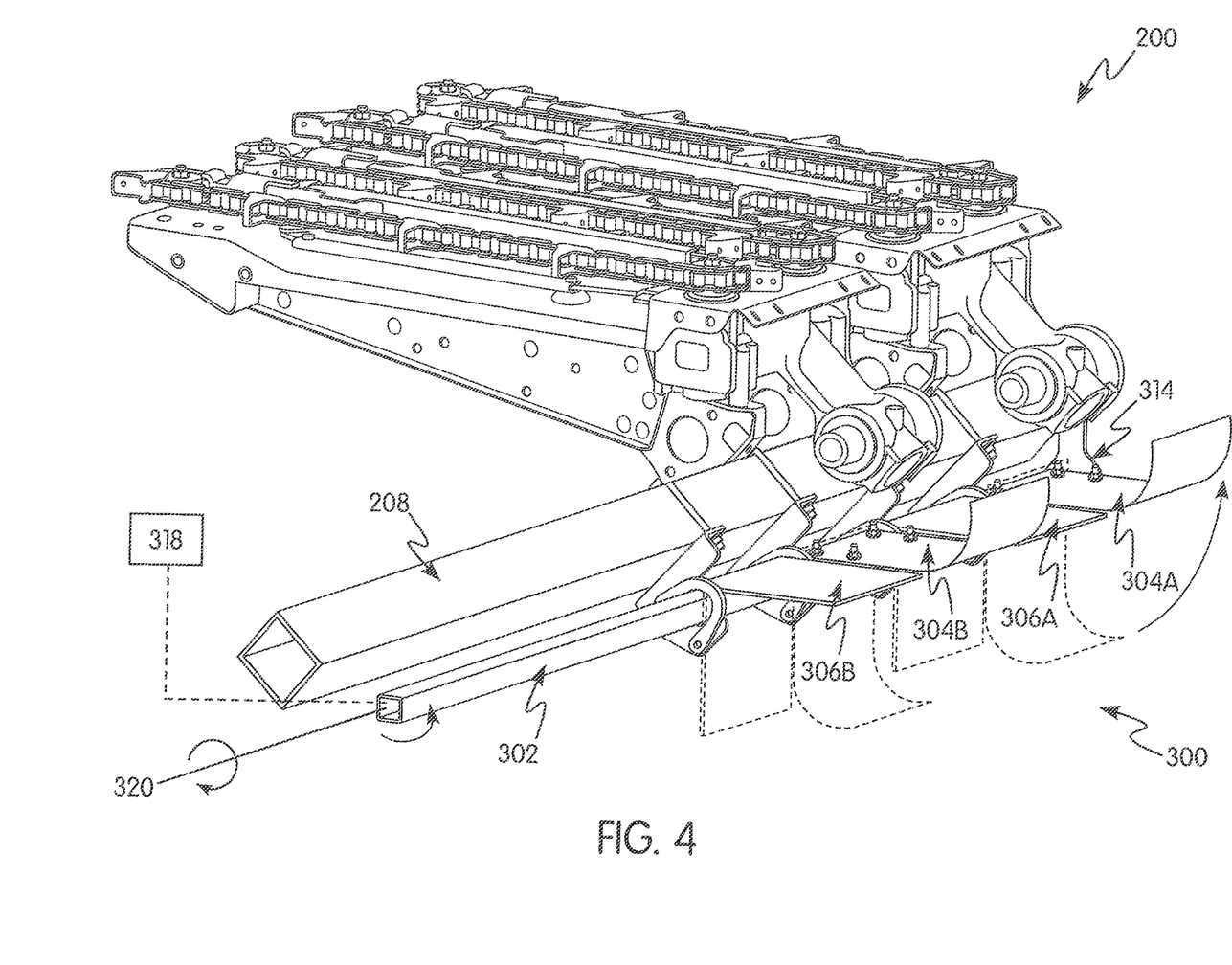
FIG. 4 is a partial rear perspective view of a header in accordance with exemplary embodiments of the present disclosure.

In operation, adjustable assembly 300 according to the present disclosure is configured such that control arm 302 is rotatable about its longitudinal axis 314. Thus, as depicted in FIGS. 3A, 3B, and 4, control arm 302 can be rotated between a work position, wherein, for example, lower portions 310 of the plurality of stalk stompers 304A, 304B, and 304C can come in contact with the stalks or the ground, and a storage position, wherein lower portions 310 of the plurality of stalk stompers 304A, 304B, and 304C can be spaced away from and the stalks and the ground at any desired angle. This adjustment of the angle of the plurality stalk stompers 304A, 304B, and 304C provides for a tensioning system to achieve a desired force to flatten/knock down stalks during harvesting operations. Adjustment of the desired angle can be achieved either by manually rotating control arm 302 with the aid of handle 314 or, alternatively, via actuator 318 operatively engaged with control arm 302 for adjusting the rotational position of control arm 302. Furthermore, the height of tool bar 202 can be raised or lowered relative to the ground to adjust the height of the plurality of members, e.g., stalk stompers 304A, 304B, and 304C and chopper curtains 306A, 306B, 306C, and 306D, based on different cut heights of the stalks.

In certain embodiments, the adjustable assemblies according to the present disclosure can be automated and/or self-adjusting with regard to the distance of the plurality of members configured to knock down/flatten plant/crop stalks and/or shield the agricultural harvester from flying debris, e.g., stalk stompers 304A, 304B, and 304C and chopper curtains 306A, 306B, 306C, and 306D, from the ground or stalk cut heights. As such, the adjustable assemblies according to the present disclosure can further include one or more sensors that detect proximity to the ground and/or plant/crop stalks and/or detect pressure against the at least one member configured to knock down plant stalks and/or to shield the agricultural harvester from flying debris and that are in operative communication with a control unit, which, in turn, is in operative communication with an actuator 318 to control a height, angle, and/or other position of the adjustable assembly, as necessary to optimize harvesting operations based on, e.g., crop type, crop height, and/or terrain conditions. In certain embodiments, the control unit is pre-programmed to respond based on the data input received from the one or more sensors. In certain other embodiments, the control unit is operated manually, e.g., by the operator in the cab of the combine harvester, based on the data received from the one or more sensors. Furthermore, the adjustable assemblies according to the present disclosure can be programmed and/or operated, for example, from the cab of the combine harvester by the operator, such that the members configured to knock down plant stalks and/or to shield the agricultural harvester from flying debris are automatically rotatably deployed downwards while the combine harvester is performing harvesting operations and retracted upwards when the combine harvester is stationary or moving in reverse or when the header is being transported or stored.

Figure 5:
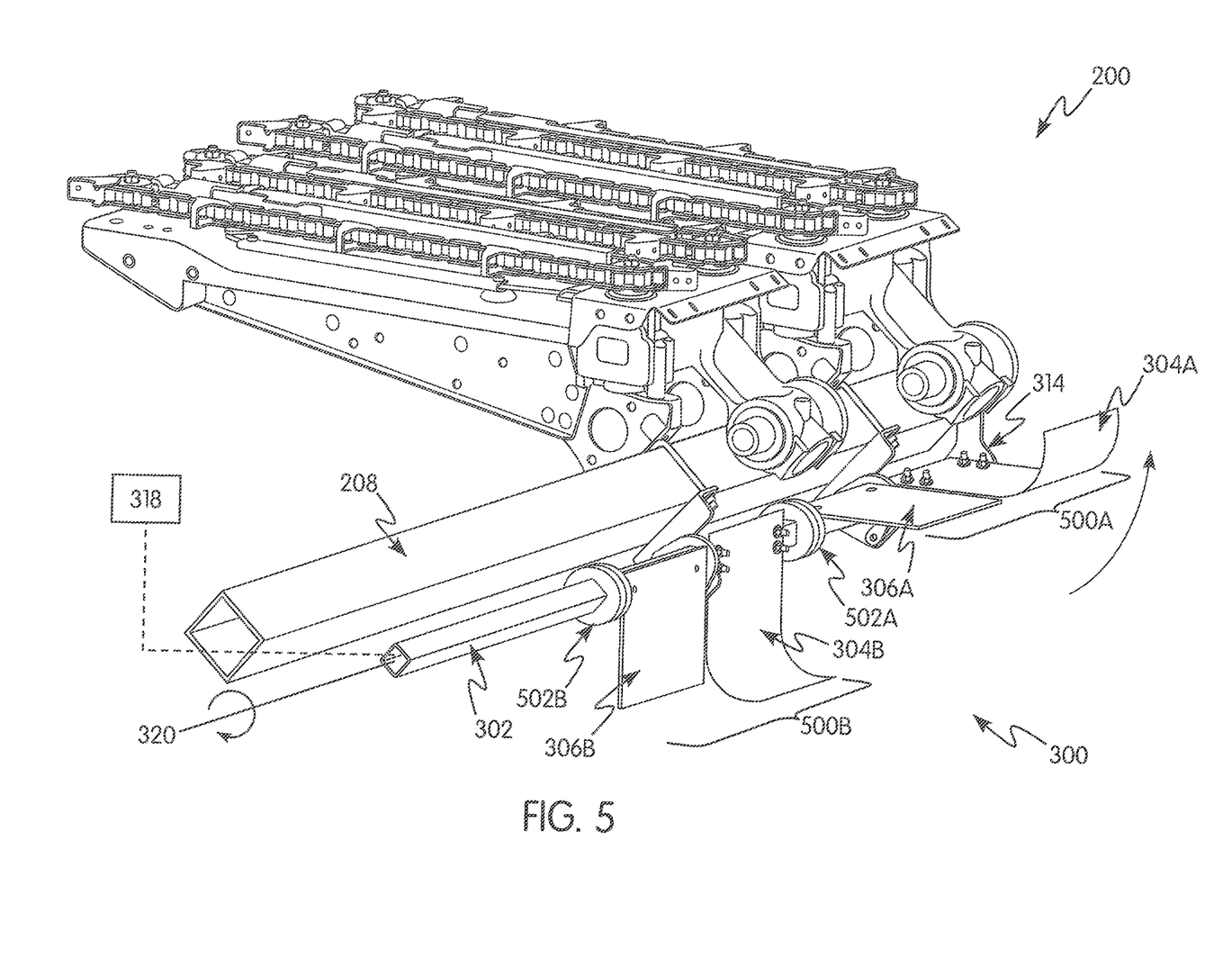
FIG. 5 is a partial rear perspective view of a header in accordance with exemplary embodiments of the present disclosure.

In certain embodiments, and as best shown in FIG. 5, the adjustable assemblies according to present disclosure can be modular. In other words, the adjustable assemblies according to present disclosure can be independently attached to tool bar 208, operated (e.g., rotatably raised into a storage position and rotatably lowered into a working position), and removed from tool bar 208 as discrete segments 500A and 500B of rotating control arms 302 to which is connected at least one member configured to knock down plant stalks and/or to shield the agricultural harvester from flying debris (e.g., a plurality of stalk stompers 304A, 304B, and 304C and/or chopper curtains 306A, 306B, 306C, and 306D). Thus, in certain embodiments according to the present disclosure, the orientation of a first sub-plurality (e.g., module) of members of the plurality of members configured to knock down plant stalks and/or to shield the agricultural harvester from flying debris connected to the control arm 302 is adjustable independent of the orientation of a second module of these members. This independent movement of each module of adjustable assemblies can be achieved by any suitable mechanism, including, for example, by rotors 502A and 502B. In certain other embodiments according to the present disclosure, such first and second (or third, etc.) modules of members configured to knock down plant stalks and/or to shield the agricultural harvester from flying debris can be removably connectable to the control arm 302 independent of each other.

The primary purpose of the plurality of stalk stompers 304A, 304B, and 304C is to flatten/knock down crop stalks (e.g., corn stalks) after the crop (e.g., ears of corn) has been removed. However, by virtue of their shape (as shown in FIGS. 2-5), which is similar in shape to that of the plurality of chopper curtains 306A, 306B, 306C, and 306D, the plurality of stalks stompers 304A, 304B, and 304C also serve to effectively block the flying debris generated during harvesting operations in the same manner as the plurality of chopper curtains 306A, 306B, 306C, and 306D, e.g., by effectively forming a blocking wall. In this same manner, the plurality of stalk stompers 304A, 304B, and 304C, in conjunction with the plurality of chopper curtains 304A, 304B, 304C, and 304D, also assists in containing the sucrose spray spattered by corn stalks during the harvesting operations.

Headers comprising the various embodiments of the of the present disclosure provide numerous advantages over conventional headers equipped with either stalk stompers or chopper curtains alone or with both stalk stompers and chopper curtains individually attached to the header as separate components. The adjustable assemblies according to the present disclosure prevent damage to components of agricultural harvesters by flattening/knocking down standing corn stalks and blocking flying debris generated during harvesting operations. Additionally, by configuring the adjustable assemblies according to the present disclosure such that the stalk stompers 304A, 304B, and 304C and chopper curtains 306A, 306B, 306C, and 306D are alternated along the control arm 302 in the same plane reduces the complexity involved in positioning these tools along the tool bar. Furthermore, in contrast to conventional stalk stompers, the stalk stompers of the adjustable assemblies according to the present disclosure can be formed from lightweight materials, so that the overall weight of the adjustable assemblies is substantially less than the total weight of an equivalent plurality of conventional stalk stompers and chopper curtains, which makes the adjustable assemblies of the present disclosure easier to use, reposition, and remove, as well as mitigating the risk of soil compaction. The adjustable assemblies according to the present disclosure also allow for movement from a work position to a storage position and back without removing any components from the header and at a single time rather than needing to adjust these components individually. As such, this retractability of the adjustable assemblies according to the present disclosure into a storage position is advantageous when placing the header on a trailer for transport or on the ground for storage, as it eliminates the need to remove the members configured to knock down plant stalks and/or to shield the agricultural harvester from flying debris from the adjustable assembly. As such, the adjustable assemblies according to the present disclosure can also be configured to have multiple set points to accommodate different stalk stubble cut heights. Furthermore, the adjustable assemblies according to the present disclosure can be modular and, as such, can be either factory or customer installed. Overall, the design of the adjustable assemblies according to the present disclosure are more streamlined compared to conventional assemblies of conventional stalk stompers and chopper curtains, resulting in less weight, improved weight distribution and functionality, as well as mitigation of tripping hazards.

While the present disclosure has been described with reference to exemplary embodiments, it will be appreciated by those skilled in the art that various changes may be made and equivalents may be substituted for elements thereof without departing from the scope of the subject disclosure. For example, features described in one embodiment may be incorporated into a different embodiment. In addition, modifications may be made to adapt a particular situation or material to the teachings of the present disclosure without departing from the essential scope thereof. It is to be understood, therefore, that the present disclosure is not limited to the particular aspects disclosed, but it is intended to cover modifications within the spirit and scope of the present disclosure as defined by the appended claims and discussed above.

We claim:

1. An adjustable assembly for attachment to a header of an agricultural harvester comprising:
a control arm extending along a longitudinal axis, the control arm rotatable about the longitudinal axis between a first a first position and a second position; and
a plurality of members connected to the control arm and rotatable between a stowed position and a deployed position to knock down plant stalks and shield against flying debris, the plurality of members comprising a plurality of first members, each comprising a curved lower portion and a planar upper portion, and a plurality of second members, each having a substantially planar shape,
wherein the control arm is configured to adjust an orientation of the plurality of members relative to ground, and
wherein the plurality of second members and the planar upper portion of each of the plurality of first members are vertical when the plurality of members are in the second position.

2. The adjustable assembly of claim 1, wherein each of the plurality of members is adjacent to another of the plurality of members.

3. The adjustable assembly of claim 1, wherein the plurality of members are aligned substantially in a single plane.

4. The adjustable assembly of claim 1, wherein the first plurality of members area plurality of stalk stompers configured to knock down plant stalks and wherein the second plurality of member are a plurality of chopper curtains configured to shield against flying debris.

5. The adjustable assembly of claim 4, wherein the plurality of stalk stompers are alternatingly arranged with the plurality of chopper curtains along a length of the control arm.

6. The adjustable assembly of claim 1, wherein a longitudinal extent of a lateral edge of one of the plurality of members extends substantially a length of an entire longitudinal extent of a lateral edge of at least one other of the plurality of members.

7. The adjustable assembly of claim 1, wherein one of the plurality of members has a longitudinal length greater than a longitudinal length of at least another of the plurality of members.

8. The adjustable assembly of claim 1, wherein one of the plurality of members comprises a metal, a high density polymer, an elastomer, or a composite, and wherein another of the plurality of members comprises another of a metal, a high density polymer, an elastomer, or a composite.

9. The adjustable assembly of claim 1, wherein an orientation of a first sub-plurality of members of the plurality of members connected to the control arm is adjustable independent of an orientation of a second sub-plurality of members of the plurality of members connected to the control arm.

10. The adjustable assembly of claim 9, wherein the first and second sub-pluralities of members are removably connectable to the control arm independent of each other.

11. The adjustable assembly of claim 1, wherein at least one of the plurality of members is removably connected to the control arm.

12. The adjustable assembly of claim 1, wherein the control arm is rotatable about its longitudinal axis to adjust the orientation of the plurality of members relative to the ground.

13. The adjustable assembly of claim 1, wherein at least one of the plurality of members is quadrilateral in shape.

14. The adjustable assembly of claim 1, wherein each of the plurality of members is movable between a first position and a second position spaced from the first position.

15. The adjustable assembly of claim 1, further comprising a biasing member biasing at least one of the plurality of members toward the ground.

16. The adjustable assembly of claim 15, wherein the biasing member is a torsion spring, a polymer torsion block, a gas shock, or a leaf spring.

17. The adjustable assembly of claim 15, wherein the biasing member is directly connected to the control arm and the at least one of the plurality of members.

18. A machine comprising the adjustable assembly of claim 1, wherein the machine is selected from the group consisting of combine harvesters, forage harvesters, flail mowers, and rotary mowers.

19. A header for an agricultural harvester comprising:
a frame having a toolbar having a longitudinal axis; and
an adjustable assembly comprising:
- a control arm operatively connected to the tool bar, the control arm extending along a longitudinal axis parallel to the longitudinal axis of the toolbar and offset from the longitudinal axis of the toolbar, the control arm rotatable about its longitudinal axis, and
- a plurality of members connected to the control arm to knock down plant stalks or to shield against flying debris,
- wherein the control arm is configured to adjust an orientation of the plurality of members relative to ground or the frame.

20. The header of claim 19, further comprising an actuator operatively engaged with the tool bar for adjusting one of a translational position and an angle of the control arm relative to the frame.

21. The header of claim 19, further comprising a row unit, and wherein at least one of the plurality of members is positioned about a lower rear end of the row unit.

22. An agricultural harvester comprising the header of claim 19.

* * * * *